United States Patent
Vaswani et al.

(10) Patent No.: US 12,212,601 B2
(45) Date of Patent: Jan. 28, 2025

(54) TRANSPORT LAYER SECURITY COMPUTER DEVICES AND METHODS

(71) Applicant: Microsoft Technology Licensing, LLC, Redmond, WA (US)

(72) Inventors: Kapil Vaswani, Cambridge (GB); Siddharth Jayashankar, Pittsburgh, PA (US); Antoine Delignat-Lavaud, Cambridge (GB); Cedric Alain Marie Christophe Fournet, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 218 days.

(21) Appl. No.: 18/066,383

(22) Filed: Dec. 15, 2022

(65) Prior Publication Data

US 2024/0137210 A1 Apr. 25, 2024
US 2024/0235819 A9 Jul. 11, 2024

(30) Foreign Application Priority Data

Oct. 21, 2022 (IN) .............................. 202241060226

(51) Int. Cl.
*H04L 29/06* (2006.01)
*H04L 9/08* (2006.01)
(Continued)

(52) U.S. Cl.
CPC .......... *H04L 63/166* (2013.01); *H04L 9/0825* (2013.01); *H04L 9/0861* (2013.01); *H04L 9/3247* (2013.01)

(58) Field of Classification Search
CPC .................................................. H04L 63/166
See application file for complete search history.

(56) References Cited

U.S. PATENT DOCUMENTS

2016/0086172 A1\* 3/2016 Kamal ............... G06Q 20/3227
705/71
2016/0182499 A1\* 6/2016 Sharaga .................. G06F 21/82
713/156
(Continued)

OTHER PUBLICATIONS

"A Readable Specification of TLS 1.3", Retrieved From: https://web.archive.org/web/20220517050923/https://www.davidwong.fr/tls13/, May 17, 2022, 122 Pages.
(Continued)

*Primary Examiner* — Bradley W Holder
(74) *Attorney, Agent, or Firm* — Barta Jones, PLLC

(57) ABSTRACT

A computer device instantiates a first Transport Layer Security (TLS) endpoint having access to a trusted execution environment (TEE) of the processor; generates in the TEE in an endpoint-specific public-private key pair bound to the first TLS endpoint; generates of attestation data verifying that the endpoint-specific public-private key pair was generated in the TEE and is bound to the first TLS endpoint; and signs the attestation data in the TEE using a TEE private key securely embedded in the processor. The device generates a TEE signature using an endpoint-specific private key of an endpoint-specific public-private key pair; and indicates of the attestation data, an endpoint-specific public key of the endpoint-specific public public-private key pair and the TEE signature to a second TLS endpoint within a TLS handshake message exchange between the first TLS endpoint and the second TLS endpoint.

20 Claims, 11 Drawing Sheets

(51) Int. Cl.
    *H04L 9/32*           (2006.01)
    *H04L 9/40*           (2022.01)

(56)              References Cited

U.S. PATENT DOCUMENTS

| | | | |
|---|---|---|---|
| 2023/0013347 A1* | 1/2023 | Moyer | H04L 9/006 |
| 2023/0155984 A1* | 5/2023 | Adam | H04L 63/0281 |
| | | | 726/26 |

OTHER PUBLICATIONS

Gallery, et al., "Trusted Mobile Platforms," Foundations of Security Analysis and Design Iv; [lecture Notes in Computer Science], pp. 282-323, Aug. 18, 2007.

Gasmi, et al., "Beyond Secure Channels", Conference on Computer and Communications Security. STC'07, Proceedings of the 2007 ACM Workshop on Scalable Trusted Computing. Nov. 2, 2007, pp. 30-40.

International Search Report and Written Opinion received for PCT Application No. PCT/US2023/031927, mailed on Date Dec. 21, 2023, 14 pages.

Latze, et al., "Transport Layer Security (TLS) Extensions for the Trusted Platform Module (TPM); draft-latze-tls-tpm-extns-02.txt," Internet Engineering Task Force, IETF; No. 2, pp. 1-11, Aug. 6, 2010.

* cited by examiner

TRANSPORT LAYER SECURITY COMPUTER DEVICES AND METHODS

TECHNICAL FIELD

The present disclosure relates to computer devices, systems and computer-implemented methods implementing the Transport Layer Security protocol.

BACKGROUND

Transport Layer Security (TLS) is the standard protocol for establishing cryptographically secure network connections over untrusted networks. TLS builds upon public-key cryptography, for the secure exchange of keys. The current approved version of TLS is version 1.3, which is specified in "RFC 8446: The Transport Layer Security (TLS) Protocol Version 1.3" (https://www.rfc-editor.org/rfc/rfc8446), the content of which is incorporated herein in its entirety.

TLS includes a handshake message exchange, which is used to negotiate the security parameters of the connection between a client and a server device, before the exchange of application data. The handshake includes a Certificate message, which allows the server to share a certificate issued by a trusted third party (the Certificate Authority (CA), of the certificate). The handshake also includes a CertificateVerify message, which allows the client to verify that the server is the holder of the private key corresponding to the certificate.

SUMMARY

In overview, examples of the invention provide a means of extending or modifying the authentication part of the handshake of the TLS protocol, to not only allow verification of domain ownership using TLS certificates, but also the attestation of a trusted execution environment (TEE). This proves during authentication that data exchanged using the protocol is held only within a specific TEE. Such authentication improves security in circumstances in multi-tenanted computing environment, such as cloud computing systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
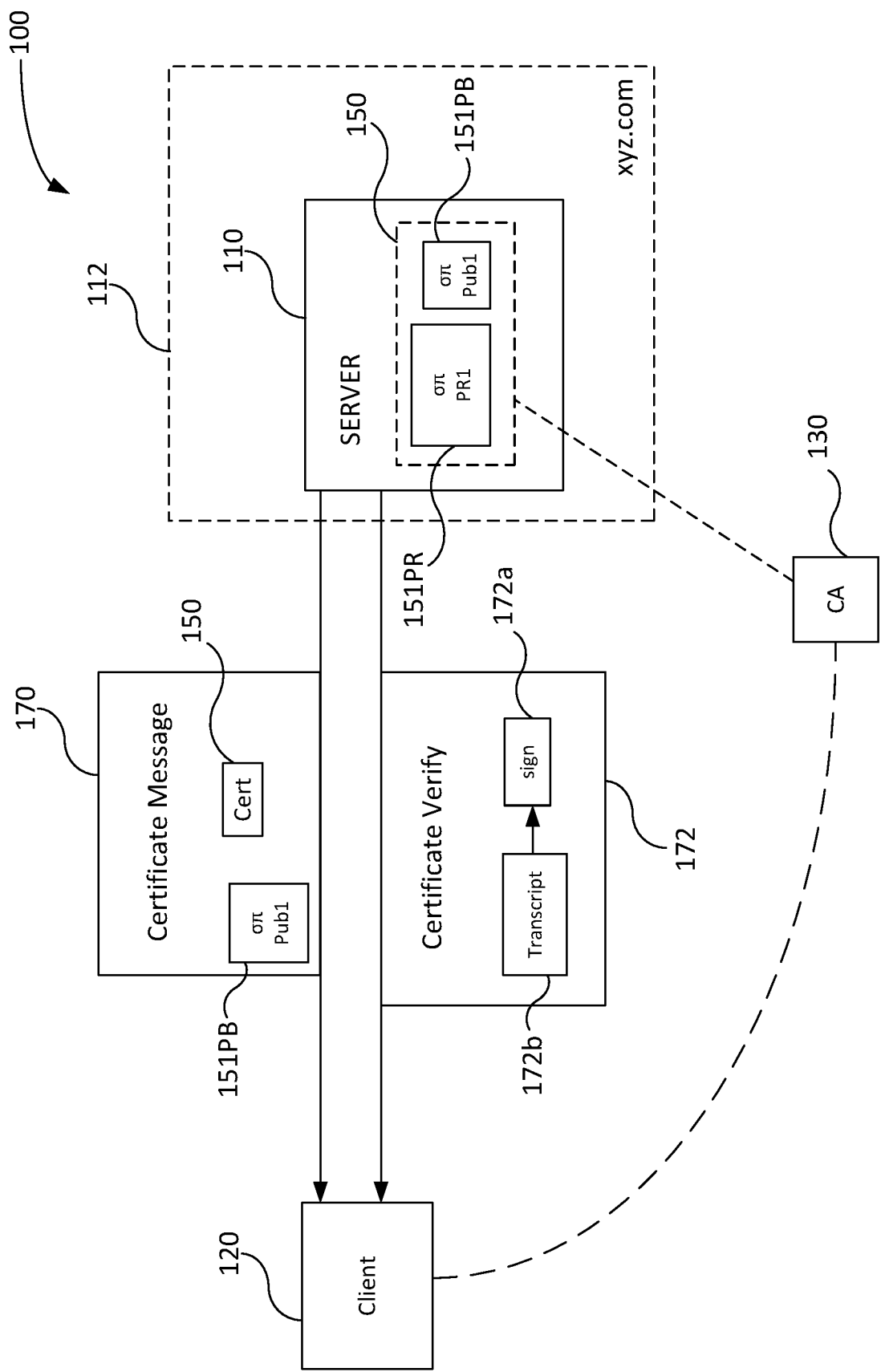
FIG. 1 is a schematic block diagram illustrating aspects of the TLS handshake.

FIG. 1 illustrates an environment 100 in which examples of the disclosure may operate, so as to demonstrate relevant aspects of the TLS handshake message exchange to assist in understanding of the disclosure herein. It is not intended to be an exhaustive discussion of the protocol. The environment 100 is a computing environment comprising a server device 110, client device 120 and Certificate Authority (CA) 130.

The server device 110 is part of a network domain 112, given the example fictional name xyz.com herein. The domain 112 (or rather the owner of the domain) has been issued a certificate 150 (i.e. a TLS certificate, also referred to herein as a domain certificate) by the CA 130, which includes a digital signature of the CA 130. The issuance of the certificate 150 by the CA 130 is indicative of the fact that the CA 130 has attested that the holder of a private key (151PR, discussed below) corresponding to the certificate 150, is the owner of the domain 112.

In the example shown, the domain 112 includes a single server device 110, but in practice the domain 112 may comprise any number of server devices 110, forming part of the domain 112.

The certificate 150 includes a public key 151PB of a public-private key pair 151. The corresponding private key 151PR is kept secret by the domain 112

In addition to the public key 151PB digital signature of the CA 130, the certificate 150 may include various other data, such as the subject domain ("xyz.com"), the subject organization (i.e. the domain owner), the name of the issuing CA 130, issue date, expiry date and a list of additional or alternative subject domains to which the certificate applies. The certificate 150 may be in the format set out in the X.509 standard (https://www.itu.int/rec/T-REC-X.509), the contents of which are incorporated fully herein by reference.

At some juncture subsequent to the issuance of the certificate 150 to the domain 112, client device 120 seeks to communicate with the server device 110 over an untrusted network such as the Internet, using the TLS protocol. That is to say that the client device 120 and server device 110 wish to share application data in an encrypted manner. Application data herein refers to the actual data that the client device 120 and server device 110 wish to transmit to each other, in contrast to data exchanged in order to establish or administer the secure TLS communication channel between the two devices 110, 120.

The term "client" herein is merely intended to indicate that the device in question initiates the TLS connection—the client device 120 may itself be a server computer in some examples. Herein, the term "TLS endpoint" may be used to collectively refer to the client device 120 and server device 110.

Figure 2:
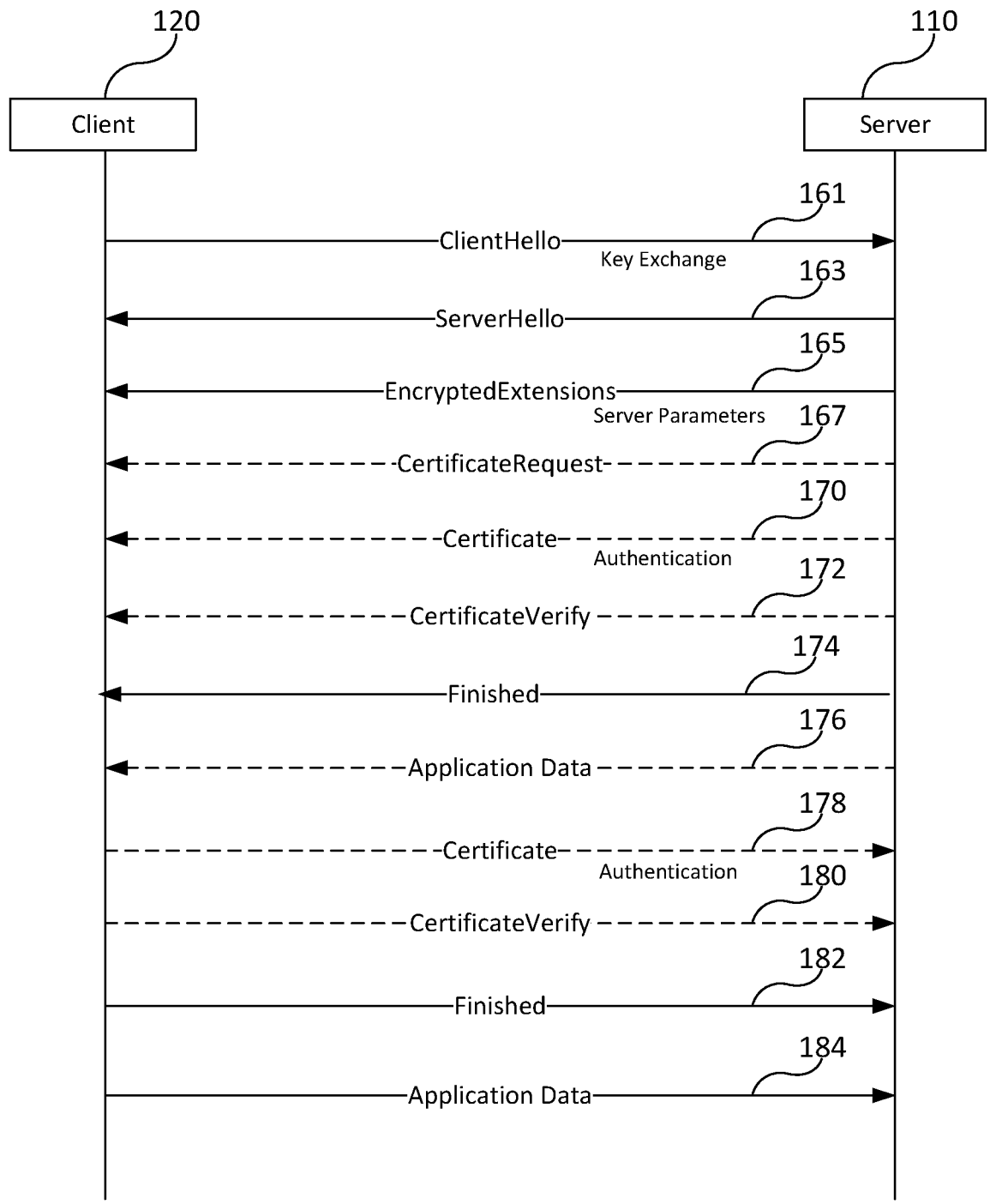
FIG. 2 is a schematic diagram illustrating messages exchanged in the TLS handshake.

TLS includes a handshake protocol. The messages exchanged as part of the handshake protocol are illustrated in FIG. 2, and briefly discussed hereinbelow.

Firstly, the procedure is initiated by the client device 120 sending a ClientHello message 161, to which the server 110 responds with a ServerHello message 163. These two messages involve establishing shared keying material and selecting cryptographic parameters (e.g. which cryptographic algorithms are supported/selected by the two devices 110, 120). Subsequent messages are then encrypted. The messages 161 and 163 can be considered a key exchange phase of the handshake protocol.

Next, the server 110 sends Encrypted Extensions message 165, to indicate any extensions that are not required to determine the cryptographic parameters. The subsequent Certificate Request message 167 is optional, and allows the server 110 to request that the client 120 shares its certificate. These messages can be considered a server parameter exchange phase of the handshake protocol Next, the procedure proceeds to an authentication phase. The server 110 sends the Certificate message 170, which is also illustrated on FIG. 1. The Certificate message 170 includes the certificate 150 and the public key 151PB. The public key 151PB may be a raw public key in the message 170, as well as forming part of the certificate 150.

The server 110 then sends a CertificateVerify message 172, which is also illustrated in FIG. 1. The CertificateVerify message 172 acts as proof that the server device 110 is in possession of the private key 151PR, which corresponds to the public key 151PB. This is accomplished by the message 172 including a signature 172a applied to the transcript hash 172b. The transcript hash is a hash of the concatenation of all previous messages exchanged between server 110 and client 120. Although the figure illustrates the transcript hash 172b being included in the message 172 to assist understanding of the purpose of the signature 172a, the hash 172b is not actually present in the message.

Upon receipt of the Certificate message 170 and CertificateVerify message 172, the client 120 verifies the signature 172a using the public key 151PB and its own knowledge of the transcript. For example, the client 120 calculates the transcript hash from the transcript, decrypts signature 172a using public key 151PB, and compares the hash and decrypted signature.

The certificate 150 is verified by client device 110, with the client 110 verifying that it recognizes and trusts the CA 130, and checking that the certificate 150 is not revoked or expired. Any suitable means of verifying the certificate 150 may be employed. The procedures discussed in "RFC 5280: Internet X.509 Public Key Infrastructure Certificate and Certificate Revocation List (CRL) Profile" (https://www.rfc-editor.org/rfc/rfc5280) may for example be employed, the contents of which are incorporated herein by reference in full.

If either the certificate 150 fails verification, or the signature 172a fails verification, the client closes the TLS connection.

Meanwhile, the server 110 having sent its authentication messages 170, 172 may send the Finished message 174, indicating that it has finished its part of the handshake. The server 110 may then proceed to share application data in message 176.

Optional messages 178 and 180 allow the client 110 to share its certificate in Certificate and CertificateVerify messages, in examples where the server 110 requests the certificate of the client device 120. The client 110 shares a Finished message 182 to indicate it is finished with its part of the handshake. This concludes the handshake, and the client 120 and server 110 proceed to then share application data, as indicated by reference numeral 184.

The TLS protocol discussed with respect to FIGS. 1 and 2 allows the client to establish that the server/domain is under the ownership/control the entity listed on the certificate 150.

Figure 3:
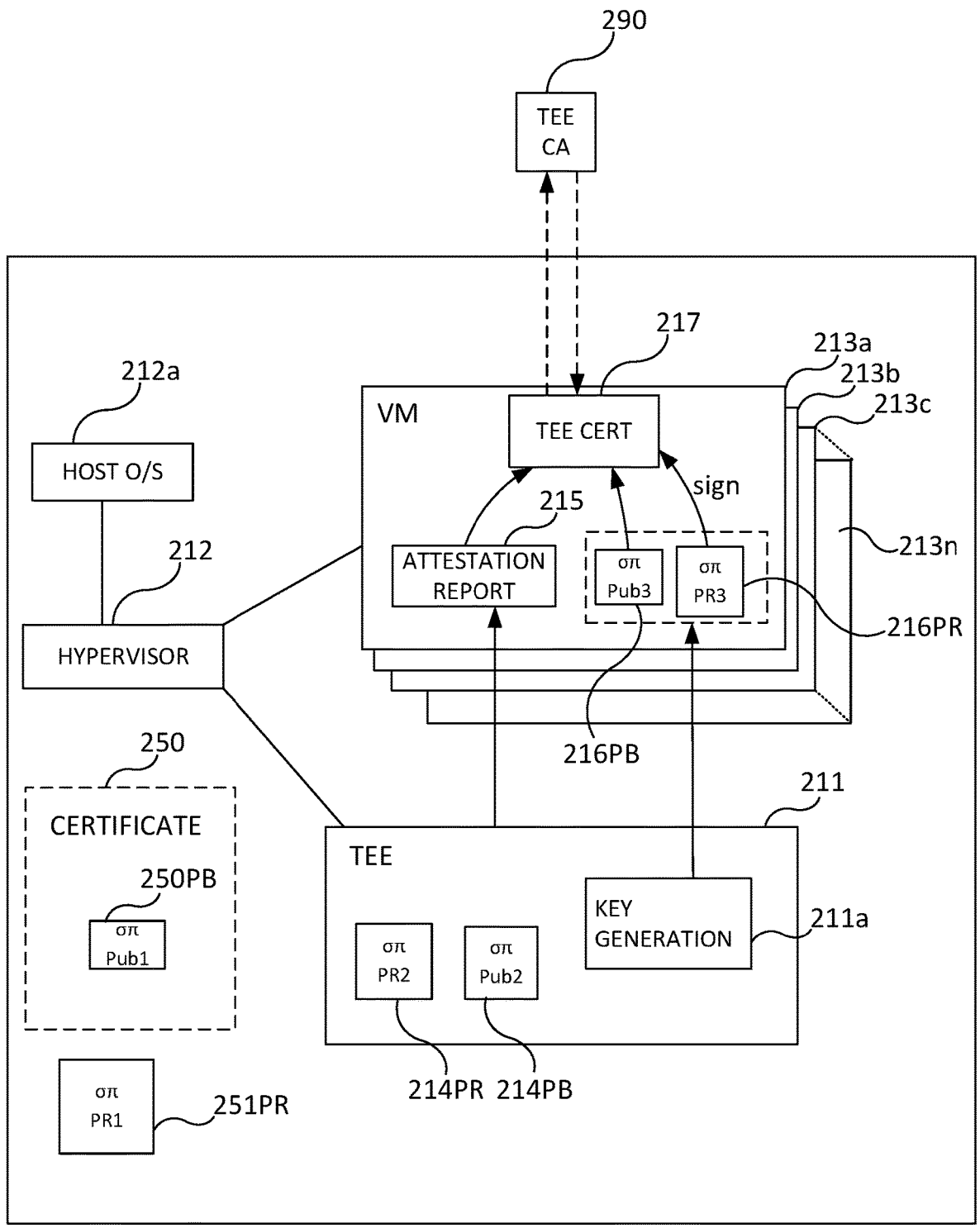
FIG. 3 is a schematic block diagram of a server included in a system in accordance with a first example of the disclosure.
Figure 4:
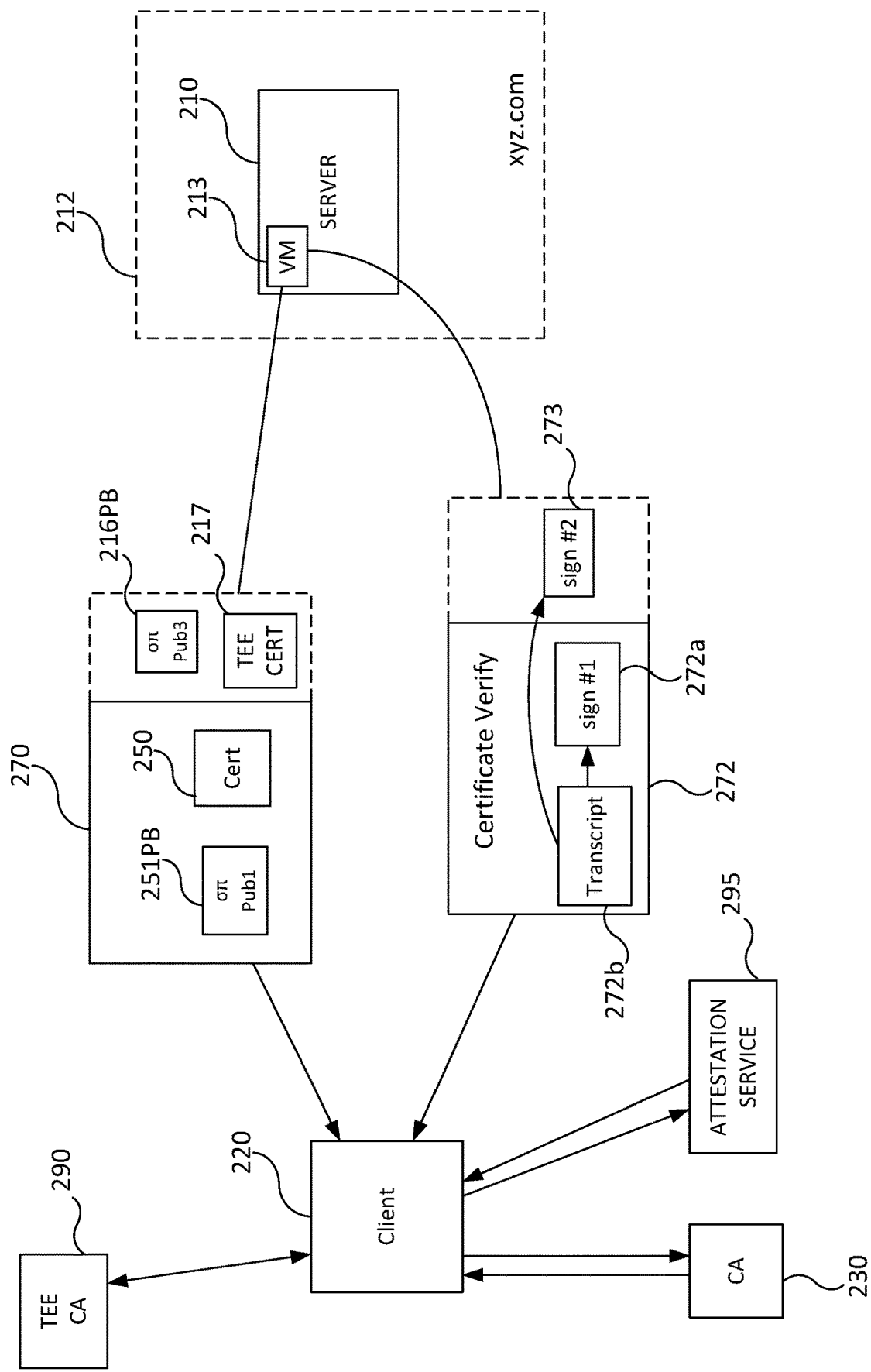
FIG. 4 is a schematic block diagram of a system in accordance with the first example of the disclosure.

FIGS. 3 and 4 illustrate a system 200 in accordance with an example of the disclosure. Elements in common with the system 100 discussed above have the corresponding reference numerals incremented by 100.

Turning first to FIG. 3, the server 210, which forms part of a domain 212, will be discussed. The server 210 is a computing device that includes a trusted execution environment (TEE) 211.

A TEE 211 is a secure environment, isolated from the main (i.e. normal) processing environment of the device 210. This provides an environment in which data in use—i.e. during processing as opposed to in transmission or in storage—can be kept secure. The TEE 211 may include protected hardware resources, including a secure storage element such as a secure area of memory and a secure area of a processor. The protected hardware resources are not directly accessible by an operating system of main processing environment. The TEE 211 thus may also include a suitable trusted operating system that provides access to the secure hardware from the main processing environment.

The TEE 211 includes a private key 214PR. That is to say, the private key 214PR is held in the TEE 211. For example, the private key 214PR may be embodied in the secure storage element. In other words, the private key 214PR is embedded in hardware (e.g. a chip such as a processor, memory chip or other hardware element) included in the TEE 211 at the time of manufacture of the server 210, with the corresponding public key 214PB being provided by the manufacturer. It is also possible that the secure storage element includes secrets from which the private key 214PR may be derived or calculated. FIG. 3 illustrates that the public key 214PB is also held in the TEE 211.

The server 210 is a server that hosts a plurality of virtual machines 213a . . . 213n, (also referred to as "instances" or VMs herein). A hypervisor 212 is included in the server 210, which manages the VMs 213, for example by instantiating them, allocating them relevant resources and scheduling execution. Instantiating a VM 213 (which is an example of more generally instantiating a TLS endpoint), may involve creating a VM using the hypervisor 212. The hypervisor 212 may run on a suitable host operating system 212a. The VMs 213 are TLS endpoints, with each VM 213 able to act as server for a respective TLS connection to a client. The VMs 213 have access to the TEE 211. For example, each VM 213 may be executed within the TEE 211 (i.e. the TEE 211 itself is able to host the VM 213). In other examples, the VMs 213 may be hosted outside the TEE 211 and access the TEE 211 by any suitable mechanism.

In one example, the server 210 is an AMD® Secure Encrypted Virtualization (SEV) server. For example, the server 210 may operate the SEV-SNP (Secure Nested Paging) functionality, such that each VM 213 is an SEV-SNP VM. This is merely an example of one suitable virtualization environment that includes a TEE. It will be appreciated that there are a number of other such environments available, including Intel® Software Guard Extensions (SGX), ARM® Confidential computing architecture (CCA) and so on.

The server 210 is in possession of a certificate 250 issued by a suitable CA (not shown), which can be used to authenticate the server 210 as discussed above in relation to FIG. 1.

In addition, each VM 213 is configured to generate a TEE certificate 217, which can be used to provide assurance that the VM 213 is being hosted in the TEE 211.

As illustrated in FIG. 3, the VM 213a uses the TEE 211 to generate an instance-specific public key 216PB and corresponding private key 216PR. That is to say that the isolated environment of the TEE 211 is used to execute the key generation software 211a. The key pair 216 is endpoint-specific, in the sense that it is bound to the particular VM 213a acting as the TLS endpoint.

The VM 213 is further configured to generate an attestation report 215, which can be used to confirm that the key generation took place in the TEE 211. The process of generating the attestation report 215 relies on the private key 214PR. The attestation report 215 also includes the public key 214PB. Accordingly, in due course the public key 214PB can be used to authenticate the attestation report 215.

The VM 213 is then configured to generate the TEE certificate 211, which indicates (e.g. includes) the attestation report 215, the instance-specific public key 216PB, and a signature provided by the instance-specific private key 216PR.

In some examples, the VM 213 submits the TEE certificate 211 to a TEE-specific CA 290, which endorses the TEE certificate 211. For example, the TEE-specific CA 290 may be an identity service such as the Microsoft Azure Attestation (MAA) service. In other examples, the VM 213 self-signs the certificate 211.

In one example, the above process of generating keys 216, attestation report 215 and TEE certificate 217 is carried out before the initiation of a TLS connection. For example, the process may be carried out upon creation of the VM 213. In other examples, the process may be carried out before every TLS session, or in response to a request from a client to generate a new attestation report 215, or on a periodic basis so as to refresh the keys 216.

FIG. 4 shows the system 200 including the server 210 and client 220. The figure illustrates the provision of the TEE certificate 217 to the client 220 as part of a modified TLS handshake.

In more detail, the Certificate message 270 includes the TEE certificate 217, and the instance-specific public key 216PB. Upon receipt of the Certificate message 270, the client 220 verifies the domain certificate 250 in the same manner as discussed above in relation to system 100.

The TEE certificate 217 is verified by the client 220 using an attestation service 295. Particularly, the client 220 may extract the attestation report 215 from the TEE certificate 217 and provide the attestation report 215 to the attestation service 295. The attestation service 295 verifies the claims in the attestation report 215, for example using the public key 214PB to verify that the report 215 has been signed using private key 214PR, held in the TEE 211. If the claims fail verification, the client 220 closes the TLS connection.

In examples where the TEE certificate 217 has been signed by a TEE-specific CA 290, the certificate 217 may be verified with reference to the TEE CA 290 in a similar manner to the domain certificate 250 with reference to domain CA 230. In some examples, the attestation service 295 and TEE CA 290 may be the same—i.e. the same service that provides hardware attestation and acts as a trusted third party certificate authority. For example, the attestation service 295 and/or TEE CA 290 may be the MAA service.

The CertificateVerify message 270 includes the domain signature 272a of the transcript hash 272b (i.e. the signature applied with domain private key 251PR and verifiable with corresponding public key 251PB). In addition, the VM 213 generates a second signature 273 over the transcript hash 272b using instance-specific private key 216PR.

Upon receipt of the CertificateVerify message 272, the client 220 then verifies that the VM 213 is in possession of the key 251PR by verifying signature 272a using the key 251PB included in the Certificate message 270. Similarly, the client verifies that the VM 213 is in possession of the key 216PR by verifying signature 273, using the key 216PU included in the Certificate message 270.

By including this extra information in the Certificate message and CertificateVerify message, the TLS handshake protocol is extended in a manner that allows the client 220 to verify that the VM 213, acting as a TLS server, operates in a TEE 211. Furthermore, this technique enables the verification without introducing any additional roundtrips.

Figure 5:
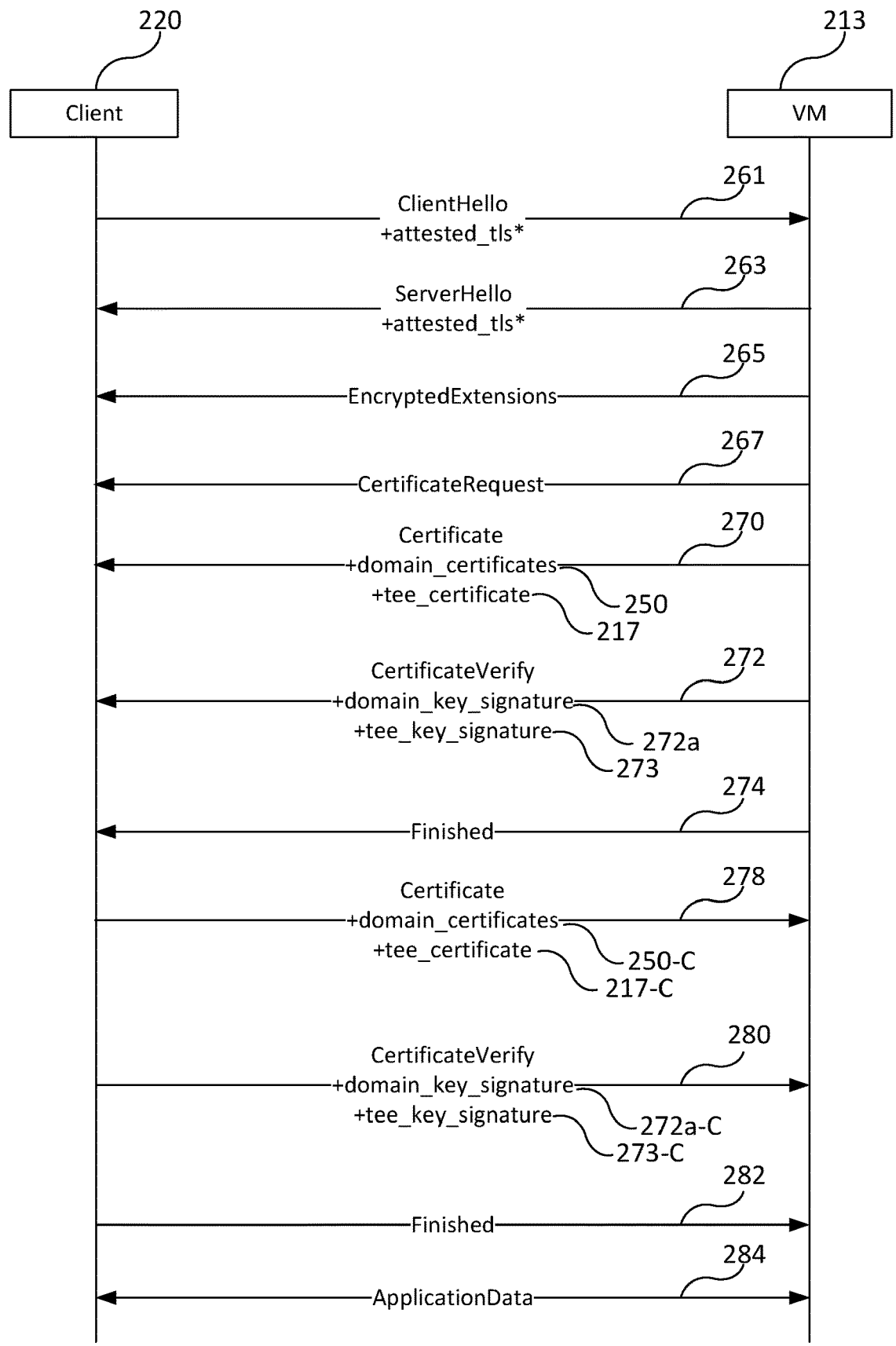
FIG. 5 is a schematic diagram illustrating the exchange of messages in the system of FIG. 4.

FIG. 5 illustrates the exchange of messages in more detail, between client 220 and the VM 213. The flow of messages is similar to the regular TLS handshake shown in FIG. 2, and thus only the differences will be discussed in detail.

Firstly, the client 220 generates and transmits a ClientHello message 261 that includes an attested_tls extension. The attested_tls extension is an indication from the client 220 to the server 210 that the client 210 wishes to use the attested handshake procedure discussed herein.

Next, the VM 213 generates and transmits ServerHello message 263 that includes an attested_tls extension. This acts as an indication that the VM 213 understands the attested handshake procedure.

Later, the VM 213 sends the Certificate message 270, including both the domain certificate 250 and the TEE certificate 217. This is followed by the CertificateVerify message 280 including the signature 272a and signature 273.

If the optional CertificateRequest message 267 has been sent by VM 213, the client 220 responds with its own Certificate message 278, including a domain certificate 250-C for the client 220, and a TEE certificate 273-C for the client 220. These are generated in an analogous way by the client 220, which in order to generate such messages must include its own TEE. This is followed by Certificate message 280, which includes signatures 272a-C and 273-C of the transcript in a similar manner to that discussed above.

The other messages operate as discussed hereinabove with respect to FIGS. 1 and 2.

In the discussion above in relation to FIGS. 3-5, both the Certificate message and CertificateVerify message are extended to include extra information allowing the client to confirm that the VM 213 is running in the TEE 211. According to the most recent TLS standard (TLS 1.3), the Certificate message supports extensions (i.e. there is space in the standard message to include further data). However, the CertificateVerify message does not support extensions. Accordingly, the above-described examples may require modification of the TLS protocol.

Figure 6:
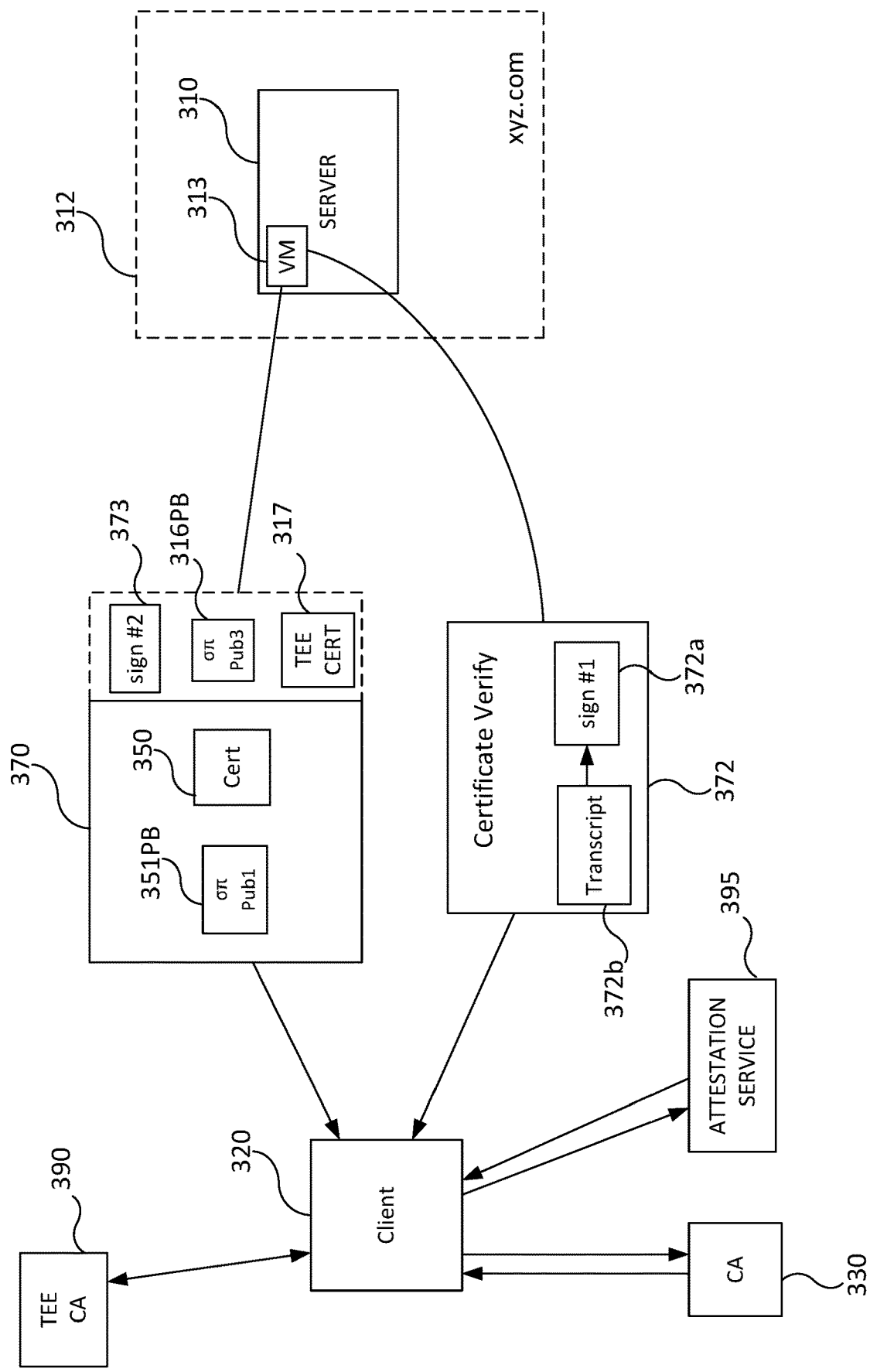
FIG. 6 is a schematic block diagram of a system in accordance with a second example of the disclosure.
Figure 7:
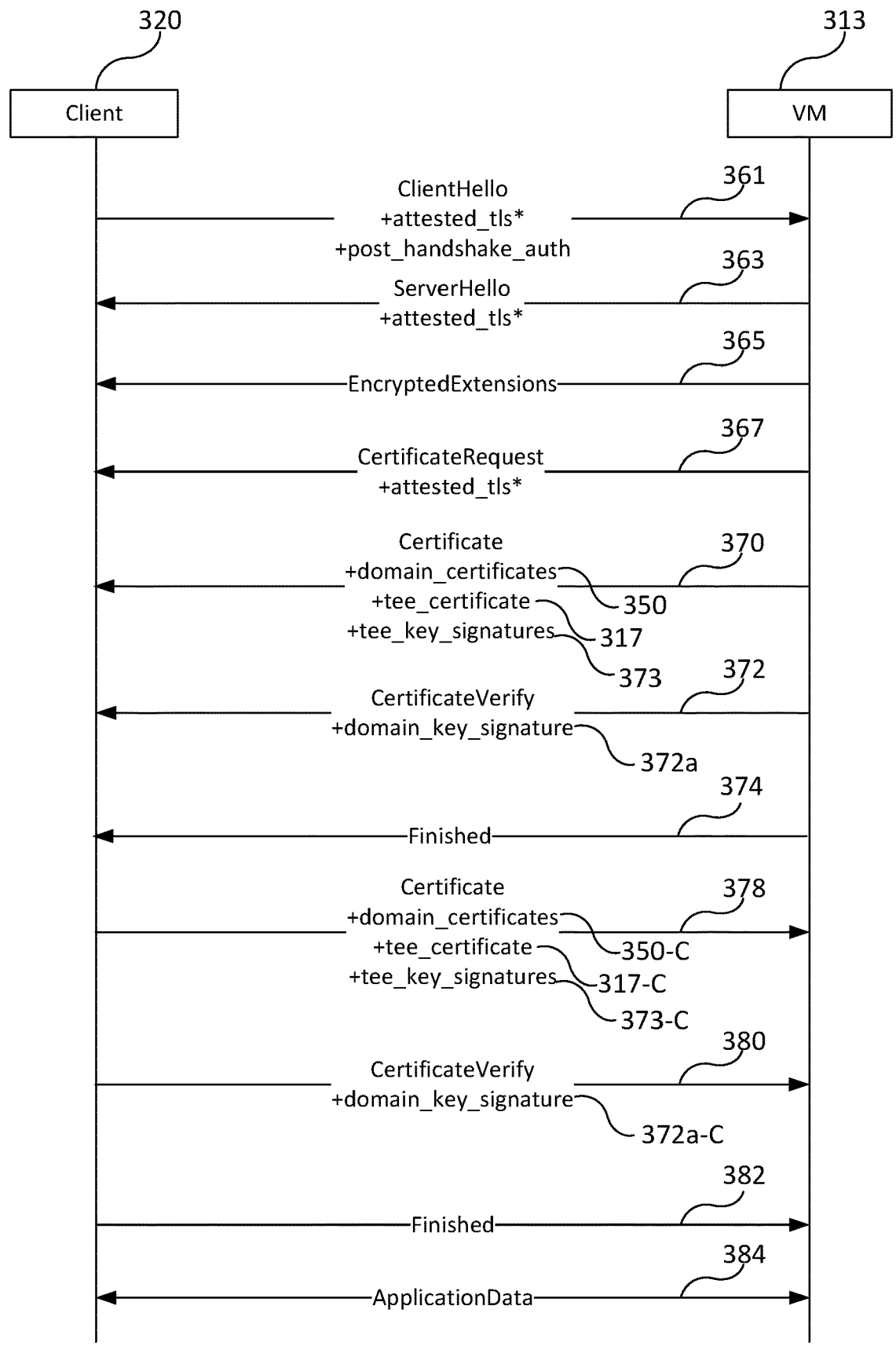
FIG. 7 is a schematic diagram illustrating the exchange of messages in the system of FIG. 6.

FIGS. 6 and 7 illustrates another example system 300 including server 310 and client 320. The system 300 is the substantially the same as system 200, with only the differences discussed in detail below. Elements in common with the system 200 discussed above have the corresponding reference numerals incremented by 100.

In short, the system 300 of FIG. 6 differs from the system 200 in that the information required for verifying the TEE certificate 317 (signature 373) is included in the Certificate message 370, rather than the CertificateVerify message 372. This avoids modification of the CertificateVerify message, thus allowing the scheme to be compliant with the TLS 1.3 protocol. The transcript upon which the transcript hash 372b is based includes the Certificate message 370, despite the Certificate message not yet having been sent. This means that the hash 372b corresponds to the hash 272b, with only the message in which it is sent differing.

FIG. 7 illustrates the exchange of messages in system 300 in more detail. The content of FIG. 7 is similar to the content of FIG. 5, and thus only the differences are discussed in detail.

As shown in FIG. 7, the TEE signature 374 is included in Certificate Message 370. CertificateVerify message 372 contains no content other than that specified in the TLS 1.3 protocol.

Similarly, the optional Certificate message 378 includes the client TEE signature 373-C, rather than it being included in the CertificateVerify message 380.

In addition, FIG. 7 illustrates that the Certificate Request message 367 may include an attested_tls extension, indicating that the VM 313 expects the client to return a TEE certificate. This optional extension may be used in circumstances where both client and server include TEE hardware and verification is required. However, in other circumstances this extension may not be included, signaling to the client that the Certificate and CertificateVerify messages need only include the domain certificate and not a TEE certificate. This may be appropriate in circumstances where the client is a legacy client running TLS libraries that do not support the attested_tls extension or attestation verification logic, but nevertheless domain authentication is required. It will be appreciated that any of the examples herein may include this optional extension to the Certificate Request message 367.

The above-described examples focus on TLS server attestation. That is to say, the process by which the server generates a TEE certificate and includes it in a Certificate message is discussed, with brief discussion of mutual attestation scenarios. However, it will be understood the discussion above applies fully to mutual attestation scenarios. That is to say, in some examples the server may request a certificate from the client as part of the handshake using the Certificate Request message. In such scenarios, the client may generate Certificate and CertificateVerify messages in substantially the same manner as the VM/server discussed above. Such mutual attestation may be particularly useful in assuring communications between different TEEs.

Furthermore, the TEE certificate discussed in the examples herein is an example of attestation data that may be provided by a TLS endpoint to provide evidence that it is running in a TEE. For example, the attestation data may take the form of the attestation report itself included in the TLS exchange, or an attestation token issued by an attestation service.

In addition, in some examples the attestation data (e.g. the TEE certificate) itself may not be included in the TLS exchange. Instead, TLS exchange may include an indication of where the attestation data can be accessed. Herein, references to indicating the attestation data includes examples where the attestation data is transmitted in the TLS exchange and where the attestation data is otherwise linked to.

Figure 8:
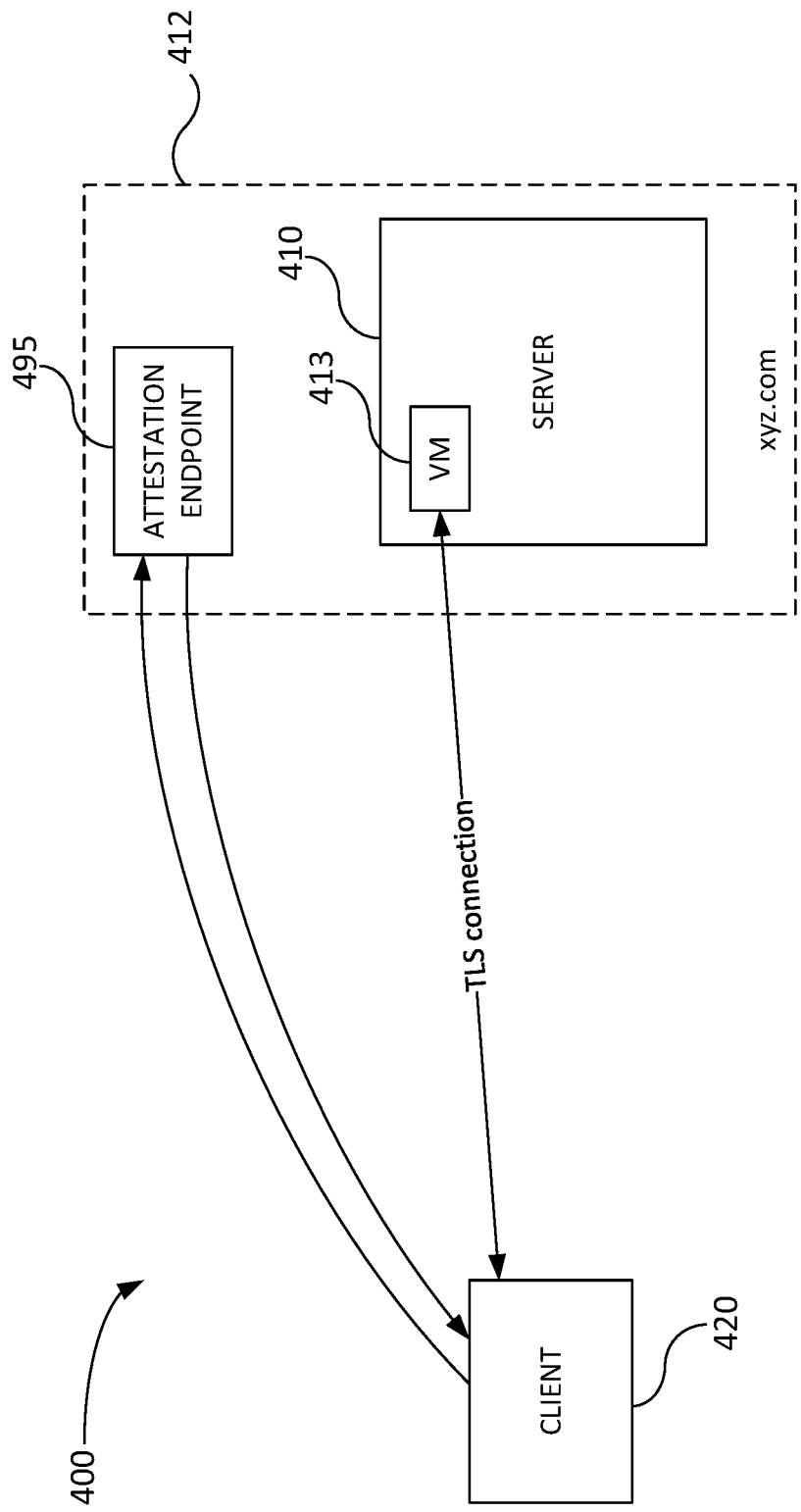
FIG. 8 is a schematic block diagram of a system in accordance with a third example of the disclosure.

FIG. 8 illustrates another example system 400. The system 400 is the substantially the same as systems 200 and 300, with only the differences discussed in detail below. Elements in common with the system 200 and 300 discussed above have the corresponding reference numerals, beginning with "4" instead of "2" or "3" respectively.

In systems 200/300, the client 220/320 verifies the attestation report 215 included in the TEE certificate 217/317 using an attestation service 295/395. In other words, this involves the client 220/320 independently accessing an attestation service 295/395 and verifying the claims made in the attestation report 215.

In contrast, in FIG. 8, the domain 412 itself includes an attestation endpoint 495. The attestation endpoint 495 may for example be an HTTP (hypertext transfer protocol) endpoint. The endpoint 495 may be hosted by the VM 413, the server 410 or another server within the domain 412.

The attestation endpoint 495 provides an attestation service for the client 420. This may be appropriate in circumstances where the client 420 rarely undertakes secure communication with a TEE, and thus it is uneconomical or impractical for the client 420 to provision an independent attestation service.

The attestation endpoint 495 is configured to receive and respond to attestation verification requests from the client 420, in a similar manner the attestation services described hereinabove. That is to say, the attestation report (or more particularly the signature applied thereto) is decrypted using the public key corresponding to the private key embedded within the TEE.

In other examples, the client 420 (and equally the clients 220 and 320 discussed above) may verify the attestation report themselves, without reference to an external endpoint 495 or service 295/395. For example, the fact that the TEE certificate is issued by a CA that the client trusts may be sufficient for the client to verify the report.

Figure 9:
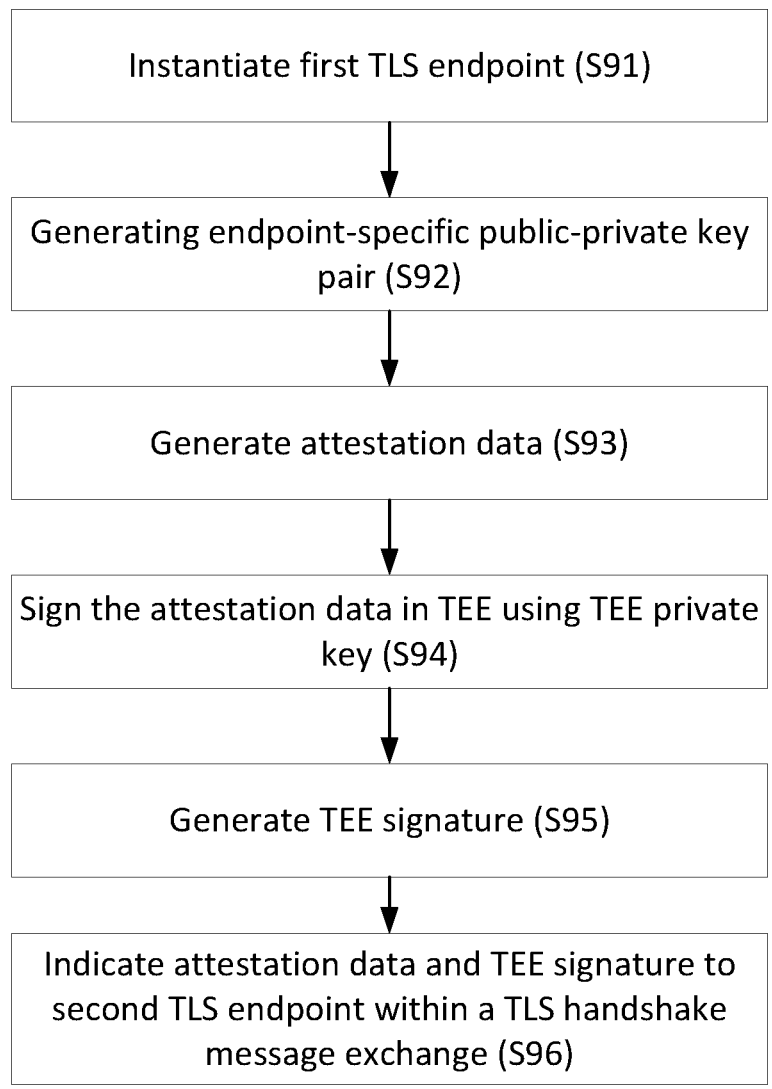
FIG. 9 is a schematic flowchart of a first example method.

FIG. 9 illustrates an example method of the disclosure. The method may be carried out by a device acting as a TLS endpoint (either as a server, or as a client in the mutual attestation scenario).

The method includes a step S91 of instantiating a first TLS endpoint that has access to a TEE. For example, this may include instantiating a VM as discussed above.

The method includes a step S92 of generating, in the TEE, an endpoint-specific (e.g. VM-specific) public-private key pair bound to the first TLS endpoint.

The method includes a step S93 of generating attestation data verifying that the endpoint-specific public-private key pair was generated in the TEE and is bound to the first TLS endpoint.

The method includes a step S94 of signing the attestation data in the TEE using a TEE private key embedded in the TEE of the processor.

The method includes a step S95 of generating a TEE signature using an endpoint-specific private key of an endpoint-specific public-private key pair; and The method includes a step S96 of indicating the attestation data, an endpoint-specific public key of the endpoint-specific public-private key pair and the TEE signature to a second TLS endpoint within a TLS handshake message exchange between the first TLS endpoint and the second TLS endpoint.

Figure 10:
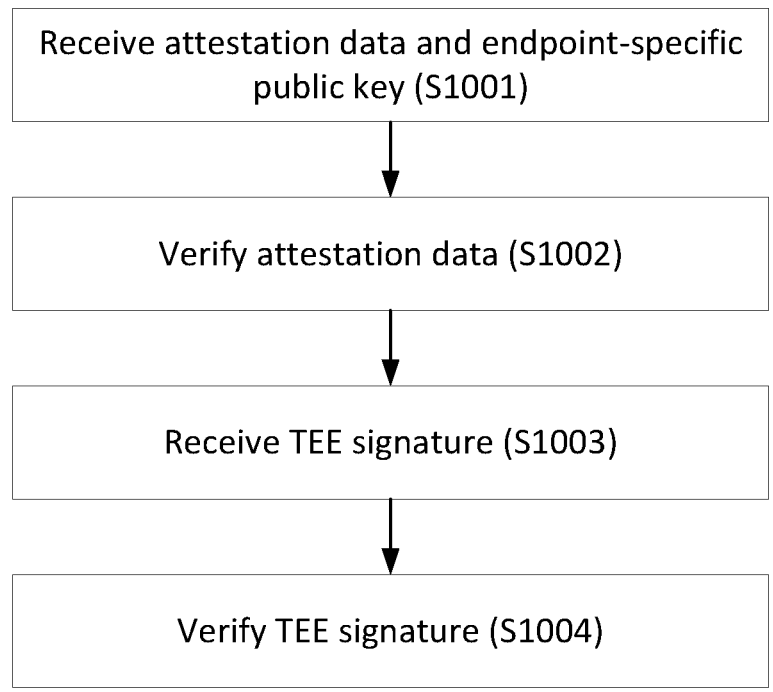
FIG. 10 is a schematic flowchart of a second example method

FIG. 10 illustrates another example method of the disclosure. The method may be carried out by a device acting as a TLS endpoint (either as a client, or as a sever in the mutual attestation scenario).

The method includes a step S1001 of receiving, within a TLS handshake message exchange, attestation data and an instance-specific public key. The method includes a step S1002 of verifying the attestation data. The method includes a step S1003 of receiving the TEE signature. The method includes a step S1004 of verifying the TEE signature using the instance-specific public key.

Figure 11:
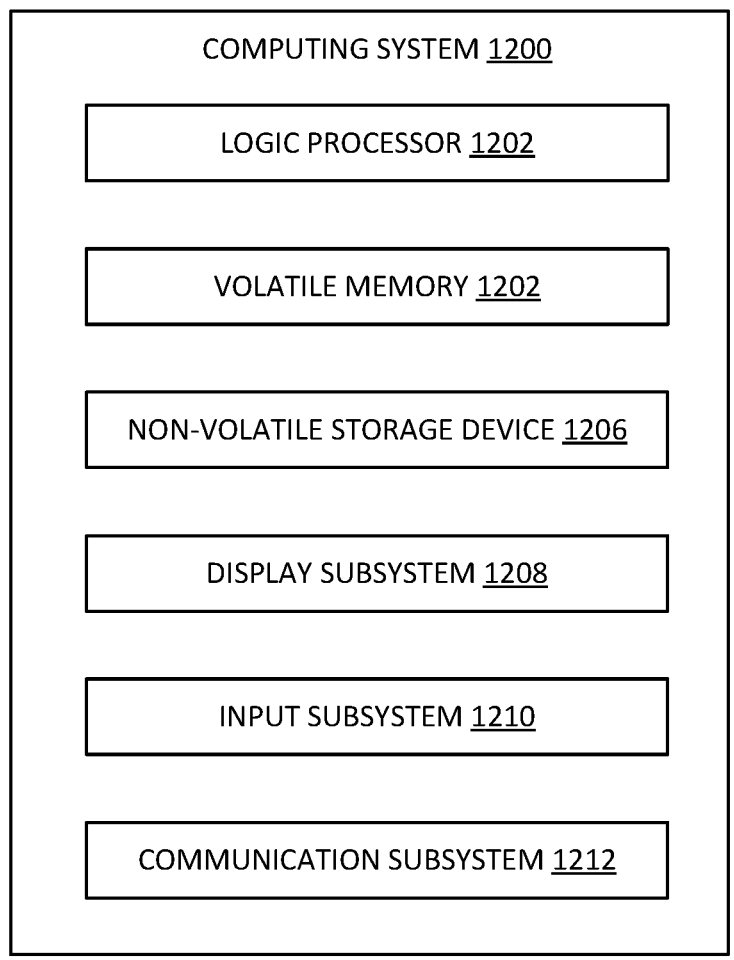
FIG. 11 is a schematic block diagram of an example computing system

FIG. 11 schematically shows a non-limiting example of a computing system 1200 that can enact one or more of the methods and processes described above. Computing system 1200 is shown in simplified form. Computing system 1200 may embody any of the computer devices 110, 120, 130, 210, 220, 230, 290, 295, 310, 320, 330, 390, 395, 410, 420 or 495 described above and illustrated in FIGS. 1-8, or any other computer device discussed herein. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 11.

Logic processor 1202, which is an example of a processing unit, includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e g., CD, DVD, HD-DVD, Blu-Ray Disc, etc), semiconductor memory (e g., ROM, EPROM, EEPROM, FLASH memory, etc.), and/or magnetic memory (e.g., hard-disk drive), or other mass storage device technology. Non volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206. Non-volatile storage device 1206 may include a secure storage element storing a TEE private key as discussed herein.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the internet.

Various modifications may be made to the examples discussed herein within the scope of the disclosure. Whilst the examples above are discussed in relation to the TLS 1.3 protocol, the concepts discussed herein may be applied to any TLS protocol, either by modifying the messages used in the protocol (i.e. so as to provide a modified protocol beyond the standard protocol) or by extending the protocol by making use of extension spaces defined in messages according to the standard. It will be understood that references herein to TLS (e.g. TLS handshake, TLS protocol) encompass the examples where the messages are not technically compliant with the protocol but instead define a modified protocol.

Although example TEE environments have been discussed, it will be appreciated that the teachings herein apply to any environment including a TEE where secure communication is desired. Similarly, a wide variety of attestation services or mechanisms are compatible with the present disclosure.

Advantageously, the systems and methods discussed herein supports attestation of services provided using a TEE, without requiring application-level encryption or introducing further round trips. Instead, the messages of the TLS protocol are advantageously leveraged to provide attestation. The use of the TLS protocol means that the systems and methods are compatible with existing mechanisms for provisioning identities and domain certificates, not requiring changes to existing public key infrastructure (PKI).

The use of TEE-specific CAs advantageously enables the issuance of certificates with relatively short expiry times. The issuance of TEE certificates avoids the need to distribute keys between different instances of the same service.

Additional example features of the disclosure are set out below.

According to a first aspect disclosed herein, there is provided a computer device, comprising: a processing unit, a secure storage element coupled to the processing unit and embodying a trusted execution environment, TEE, private key, and a memory coupled to the processing unit and configured to store executable instructions which, upon execution by the processing unit, are configured to cause the processing unit to: instantiate a first Transport Layer Security, TLS, endpoint having access to a TEE of the processor; generate in the TEE an endpoint-specific public-private key pair bound to the first TLS endpoint; generate attestation data verifying that the endpoint-specific public-private key pair was generated in the TEE and is bound to the first TLS endpoint; sign the attestation data in the TEE using the TEE private key; generate a TEE signature using an endpoint-specific private key of an endpoint-specific public-private key pair; and indicate the attestation data, an endpoint-specific public key of the endpoint-specific public public-private key pair and the TEE signature to a second TLS endpoint within a TLS handshake message exchange between the first TLS endpoint and the second TLS endpoint.

The memory may be configured to store executable instructions which, upon execution by the processing unit, are configured to cause the processing unit to transmit the attestation data in a TLS Certificate message of the TLS handshake message exchange.

The memory may be configured to store executable instructions which, upon execution by the processing unit, are configured to cause the processing unit to transmit the TEE signature in a TLS CertificateVerify message.

The memory may be configured to store executable instructions which, upon execution by the processing unit, are configured to cause the processing unit to transmit the TEE signature in the TLS Certificate message.

The memory may be configured to store executable instructions which, upon execution by the processing unit, are configured to cause the processing unit to instantiate a virtual machine, VM, as the first TLS endpoint.

The memory may be configured to store executable instructions which, upon execution by the processing unit, are configured to cause the processing unit to receive a TLS ClientHello message from the second TLS endpoint. The ClientHello message may include an indication that the second TLS endpoint wants to receive the TLS Certificate message including the attestation data. The memory may further store instructions to generate a TLS ServerHello message including an indication that the computer device is able to send the TLS Certificate message including the attestation data.

The memory may be configured to store executable instructions which, upon execution by the processing unit, are configured to cause the processing unit to receive a second TLS Certificate message from the second TLS endpoint, the second TLS Certificate message including second attestation data and a second instance-specific public key, generated by the second TLS endpoint. The memory may further store instructions to verify the second attestation data. The memory may further store instructions to receive a second TEE signature, the second TEE signature signed by a second instance-specific private key corresponding to the second instance-specific public key. The memory may further store instructions to verify the second TEE signature using the second instance-specific public key.

The memory may be configured to store executable instructions which, upon execution by the processing unit, are configured to cause the processing unit to send a Certificate Request message to the second TLS endpoint, and receive the second TLS Certificate message in response.

The memory may be configured to store executable instructions which, upon execution by the processing unit, are configured to cause the processing unit to generate a TEE certificate indicating the attestation data and an endpoint-specific public key of the endpoint-specific public public-private key pair. The memory may further store instructions to submit the TEE certificate to a TEE certificate authority, CA. The memory may further store instructions to receive an endorsed TEE certificate from the TEE CA. The memory may further store instructions to include the endorsed TEE certificate in the TLS Certificate message.

The memory may be configured to store executable instructions which, upon execution by the processing unit, are configured to cause the processing unit to generate a transcript hash from a transcript of preceding messages of the TLS handshake message exchange. The memory may further store instructions to generate the TEE signature based on the transcript hash.

According to a second aspect disclosed herein, there is provided a computer device configured to act as a first Transport Layer Security, TLS, endpoint device, the computer device comprising: a processing unit; a memory coupled to the processing unit and configured to store executable instructions which, upon execution by the processing unit, are configured to cause the processing unit to: receive, within a TLS handshake message exchange with a second TLS endpoint, attestation data and an instance-specific public key; verify the attestation data; receive a TEE signature, the TEE signature signed by an instance-specific private key corresponding to the instance-specific public key; and verify the TEE signature using the instance-specific public key.

The memory may be configured to store executable instructions which, upon execution by the processing unit, are configured to cause the processing unit to generate a TLS ClientHello message, the ClientHello message including an indication that the computer device wants to receive the TLS Certificate message that includes the attestation data.

The memory may be configured to store executable instructions which, upon execution by the processing unit, are configured to cause the processing unit to send the attestation data to an attestation endpoint in a network domain of the second TLS endpoint; and, in response, receive verification of the attestation data.

The disclosure extends to systems including a computer device according to the first aspect and a computer device according to the second aspect. Furthermore, the features of the first aspect and second aspect may be combined, so as to provide a device acting as TLS server and client.

According to a third aspect disclosed herein, there is provided a computer-implemented method, comprising: instantiating a first Transport Layer Security, TLS, endpoint having access to a trusted execution environment, TEE; generating in the TEE in an endpoint-specific public-private key pair bound to the first TLS endpoint; generating attestation data verifying that the endpoint-specific public-private key pair was generated in the TEE and is bound to the first TLS endpoint; signing the attestation report in the TEE using a TEE private key embodied in a secure storage element; generating a TEE signature using an endpoint-specific private key of an endpoint-specific public-private key pair; and indicating the attestation data, an endpoint-specific public key of the endpoint-specific public public-private key pair and the TEE signature to a second TLS endpoint within a TLS handshake message exchange between the first TLS endpoint and the second TLS endpoint.

The method may further comprise receiving, at a second TLS endpoint, the attestation data and the instance-specific public key. The method may comprise verifying the attestation data. The method may comprise receiving the TEE signature. The method may comprise verifying the TEE signature using the instance-specific public key.

The disclosure extends to a computer-implemented method corresponding to the second aspect.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer device, comprising:
   a processing unit;
   a secure storage element coupled to the processing unit and embodying a trusted execution environment, TEE, private key, and
   a memory coupled to the processing unit and configured to store executable instructions which, upon execution by the processing unit, are configured to cause the processing unit to:
   instantiate a first Transport Layer Security, TLS, endpoint having access to a TEE;
   generate in the TEE an endpoint-specific public-private key pair bound to the first TLS endpoint;
   generate attestation data verifying that the endpoint-specific public-private key pair was generated in the TEE and is bound to the first TLS endpoint;
   sign the attestation data in the TEE using the TEE private key;
   generate a TEE signature using an endpoint-specific private key of an endpoint-specific public-private key pair; and
   indicate the attestation data, an endpoint-specific public key of the endpoint-specific public-private key pair and the TEE signature to a second TLS endpoint within a TLS handshake message exchange between the first TLS endpoint and the second TLS endpoint.

2. The computer device of claim 1, wherein the memory is configured to store executable instructions which, upon execution by the processing unit, are configured to cause the processing unit to:
   transmit the attestation data in a TLS Certificate message of the TLS handshake message exchange.

3. The computer device of claim 1, wherein the memory is configured to store executable instructions which, upon execution by the processing unit, are configured to cause the processing unit to:
   transmit the TEE signature in a TLS CertificateVerify message.

4. The computer device of claim 1, wherein the memory is configured to store executable instructions which, upon execution by the processing unit, are configured to cause the processing unit to:
transmit the TEE signature in a TLS Certificate message.

5. The computer device of claim 1, wherein the memory is configured to store executable instructions which, upon execution by the processing unit, are configured to cause the processing unit to:
instantiate a virtual machine, VM, as the first TLS endpoint.

6. The computer device of claim 1, wherein the memory is configured to store executable instructions which, upon execution by the processing unit, are configured to cause the processing unit to:
receive a TLS ClientHello message from the second TLS endpoint, the ClientHello message including an indication that the second TLS endpoint wants to receive a TLS Certificate message including the attestation data; and
generate a TLS ServerHello message including an indication that the computer device is able to send the TLS Certificate message including the attestation data.

7. The computer device of claim 1, wherein the memory is configured to store executable instructions which, upon execution by the processing unit, are configured to cause the processing unit to:
receive a second TLS Certificate message from the second TLS endpoint, the second TLS Certificate message including second attestation data and a second endpoint-specific public key, generated by the second TLS endpoint;
verify the second attestation data;
receive a second TEE signature, the second TEE signature signed by a second endpoint-specific private key corresponding to the second endpoint-specific public key; and
verify the second TEE signature using the second endpoint-specific public key.

8. The computer device of claim 7, wherein the memory is configured to store executable instructions which, upon execution by the processing unit, are configured to cause the processing unit to:
send a Certificate Request message to the second TLS endpoint, and receive the second TLS Certificate message in response.

9. The computer device of claim 1, wherein the memory is configured to store executable instructions which, upon execution by the processing unit, are configured to cause the processing unit to:
generate a TEE certificate indicating the attestation data and an endpoint-specific public key of the endpoint-specific public-private key pair;
submit the TEE certificate to a TEE certificate authority, CA;
receive an endorsed TEE certificate from the TEE CA; and
include the endorsed TEE certificate in the TLS handshake message exchange.

10. The computer device of claim 1, wherein the memory is configured to store executable instructions which, upon execution by the processing unit, are configured to cause the processing unit to:
generate a transcript hash from a transcript of preceding messages of the TLS handshake message exchange; and
generate the TEE signature based on the transcript hash.

11. A computer-implemented method, comprising:
instantiating a first Transport Layer Security, TLS, endpoint having access to a trusted execution environment, TEE;
generating in the TEE an endpoint-specific public-private key pair bound to the first TLS endpoint;
generating attestation data verifying that the endpoint-specific public-private key pair was generated in the TEE and is bound to the first TLS endpoint;
signing the attestation data in the TEE using a TEE private key embodied in a secure storage element;
generating a TEE signature using an endpoint-specific private key of an endpoint-specific public-private key pair; and
indicating the attestation data, an endpoint-specific public key of the endpoint-specific public-private key pair and the TEE signature to a second TLS endpoint within a TLS handshake message exchange between the first TLS endpoint and the second TLS endpoint.

12. The method of claim 4, comprising:
receiving, at the second TLS endpoint, the attestation data and the endpoint-specific public key;
verifying the attestation data;
receiving the TEE signature; and
verifying the TEE signature using the endpoint-specific public key.

13. The method of claim 11, comprising:
transmitting the attestation data in a TLS Certificate message of the TLS handshake message exchange.

14. The method of claim 11, comprising:
transmitting the TEE signature in a TLS CertificateVerify message.

15. The method of claim 11, comprising:
transmitting the TEE signature in a TLS Certificate message.

16. A computer storage medium having computer-executable instructions that, upon execution by a processor, cause the processor to at least:
instantiate a first Transport Layer Security, TLS, endpoint having access to a trusted execution environment, TEE;
generate in the TEE an endpoint-specific public-private key pair bound to the first TLS endpoint;
generate attestation data verifying that the endpoint-specific public-private key pair was generated in the TEE and is bound to the first TLS endpoint;
sign the attestation data in the TEE using a TEE private key embodied in a secure storage element;
generate a TEE signature using an endpoint-specific private key of an endpoint-specific public-private key pair; and
indicate the attestation data, an endpoint-specific public key of the endpoint-specific public-private key pair and the TEE signature to a second TLS endpoint within a TLS handshake message exchange between the first TLS endpoint and the second TLS endpoint.

17. The computer storage medium of claim 16, wherein the computer-executable instructions, upon execution by the processor, further cause the processor to:
receive, at the second TLS endpoint, the attestation data and the endpoint-specific public key;
verify the attestation data;
receive the TEE signature; and
verify the TEE signature using the endpoint-specific public key.

18. The computer storage medium of claim 16, wherein the computer-executable instructions, upon execution by the processor, further cause the processor to:

transmit the attestation data in a TLS Certificate message of the TLS handshake message exchange.

19. The computer storage medium of claim 16, wherein the computer-executable instructions, upon execution by the processor, further cause the processor to:

transmit the TEE signature in a TLS CertificateVerify message.

20. The computer storage medium of claim 16, wherein the computer-executable instructions, upon execution by the processor, further cause the processor to:

transmit the TEE signature in a TLS Certificate message.

\* \* \* \* \*